Dec. 26, 1961 D. ROSE 3,014,497
VALVE ASSEMBLY FOR WATER TREATING APPARATUS
Filed Jan. 6, 1959 6 Sheets-Sheet 1

INVENTOR
DONALD ROSE
BY Beale & Jones
ATTORNEYS

Dec. 26, 1961 D. ROSE 3,014,497
VALVE ASSEMBLY FOR WATER TREATING APPARATUS
Filed Jan. 6, 1959 6 Sheets-Sheet 3

INVENTOR
DONALD ROSE

BY Beale & Jones
ATTORNEY

Dec. 26, 1961  D. ROSE  3,014,497
VALVE ASSEMBLY FOR WATER TREATING APPARATUS
Filed Jan. 6, 1959  6 Sheets-Sheet 5

TO UPPER MIDDLE PORTION
OF SOFTENER TANK

TO DRAIN

INVENTOR
DONALD ROSE
BY Beale & Jones
ATTORNEYS

Dec. 26, 1961 D. ROSE 3,014,497
VALVE ASSEMBLY FOR WATER TREATING APPARATUS
Filed Jan. 6, 1959 6 Sheets-Sheet 6

INVENTOR
DONALD ROSE
BY Beale & Jones
ATTORNEYS

United States Patent Office 3,014,497
Patented Dec. 26, 1961

3,014,497
VALVE ASSEMBLY FOR WATER TREATING
APPARATUS
Donald Rose, 431 W. Rahn Road, Dayton, Ohio, assignor
of one-half to Ronald D. Baker, Dayton, Ohio
Filed Jan. 6, 1959, Ser. No. 785,237
7 Claims. (Cl. 137—612.1)

This invention relates to a valve assembly for a water treating apparatus and particularly to an improved fluid pressure actuator for the flow control valves therein.

This invention is a continuation-in-part of my copending application Serial No. 707,267, filed January 6, 1958.

An object of the invention is to provide a gasket and integral pressure actuator portions formed therein with built-in biasing portions that may be used in a valve assembly.

Another object of my invention is to provide in a pressure actuated reciprocating double acting valve a structural arrangement which results in no differential pressure and wherein positive pressure is applied in either direction of operation.

A further object of the invention is to provide a pressure actuator for a reciprocating valve wherein the actuator is free from binding and frictional forces are minimized.

A still further object of the invention is to provide for a pressure actuator for a reciprocating valve that has eliminated leakage yet is free to seat and unseat the valves operated thereby with a minimum of friction.

Yet another object of the invention is to provide a highly compact and reliable valve assembly that has a minimum of wearing parts and still permits a multiplicity of different cycles of fluid flow and control with only two solenoid actuators which each directly control only a single double acting valve.

Other objects of this invention will, in part, be obvious and in part appear hereinafter.

This invention is disclosed in the embodiment thereof shown in the accompanying drawings and it comprises the features of construction, combination of elements and arrangement of parts that will be exemplified in the construction hereinafter set forth and the scope of the application of which will be indicated in the appended claims.

For a more complete understanding of the nature and scope of this invention, reference can be had to the following detailed description, taken together with the accompanying drawings, in which:

FIG. 8a is a side elevation of the valve pin with the composition valve means shown in cross section;

FIG. 8b is an enlarged fragmentary view of part of the valve actuator shown in FIG. 8;

Throughout the description like reference numerals refer to similar or like parts.

Figure 2:
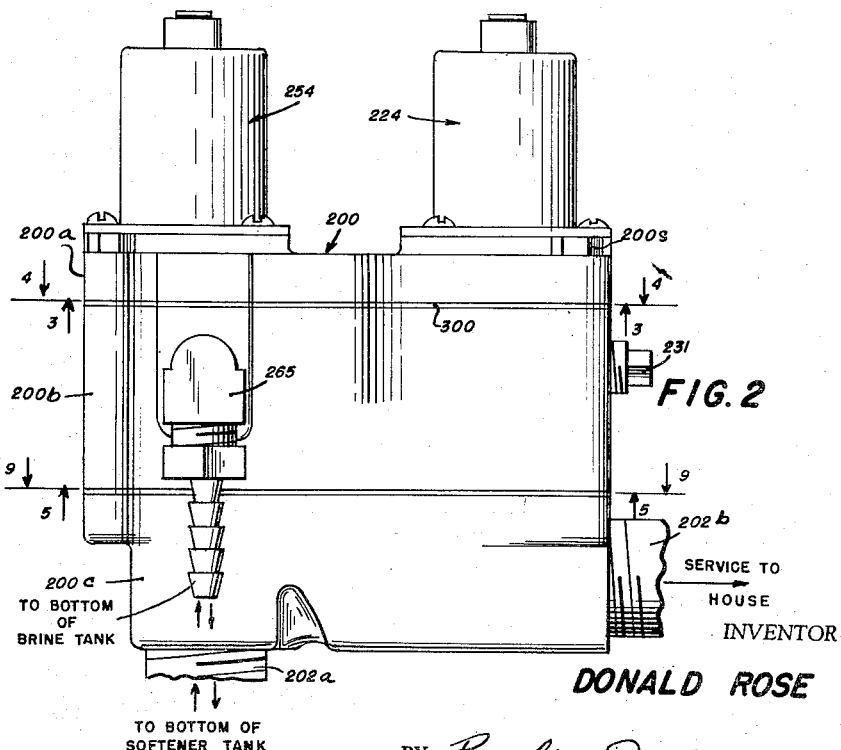
FIG. 2 is a front elevation of the valve assembly of FIG. 1.

The valve body or assembly generally indicated at 200 is made up of three sections as shown in FIG. 2, namely, a top section 200a, a middle section 200b, and a bottom section 200c, having suitable gaskets as will be explained hereinafter between sections that are held together by four cap screws 200s at each corner received in through apertures in the sections and threadedly received in threaded apertures in the bottom section 200c. The gasket 300 between sections 200a and 200b is made up to serve at least a triple function of a gasket having portions which serve as a diaphragm valve actuator having a particular configuration to provide for biasing action, the structure of which is described in greater detail hereinafter, particularly as respects FIGS. 7 and 8.

In the make up of this valve assembly three sections are here illustrated and certain passageways are made up of complementary sections in cooperating adjacent sections which assist in the ease of manufacture, assembly and repair.

Figure 6:
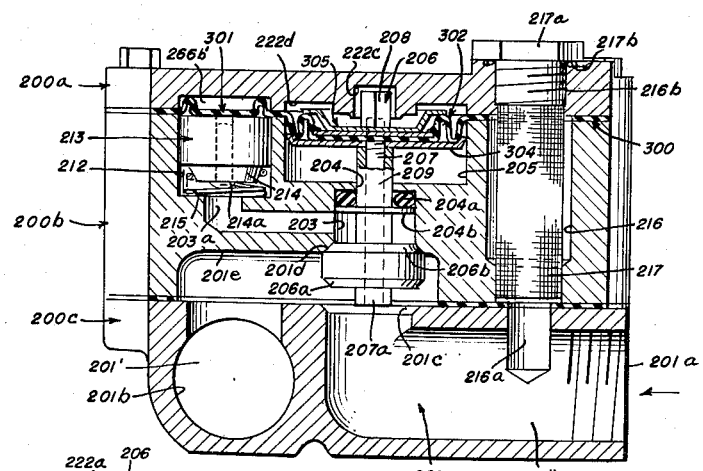
FIG. 6 is a vertical sectional view along line 6—6 of FIG. 1 showing particularly the unitary gasket and reciprocating valve actuator diaphragm.
Figure 11:
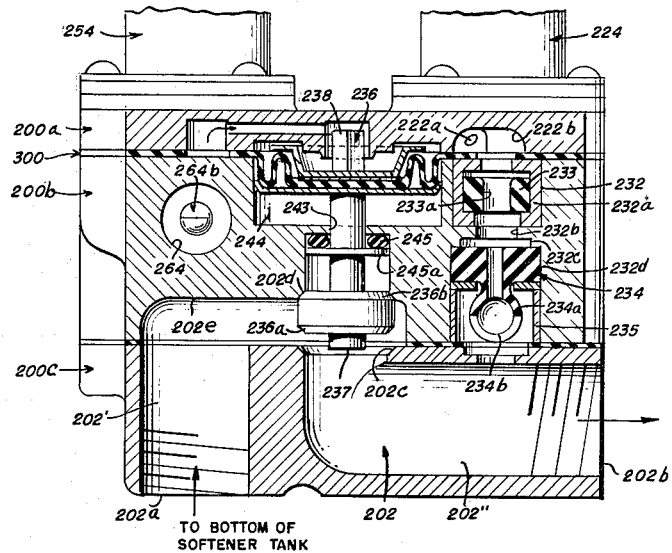
FIG. 11 is a vertical cross sectional view along line 11—11 of FIG. 1 showing the service line and certain valves therein.

Reference to FIG. 6 shows a hard water supply passageway generally indicated at 201 having an inlet end 201a, an outlet end 201b, both in the bottom section 200c. In FIG. 11 at the other side of the valve assembly is a service passageway generally indicated at 202 through which in service condition of the valve assembly, water that has been treated to soften it passes to the house service connection 202b as will later be described. The passageway 201 in FIG. 6 is offset transversely in the bottom section 200c to form a valve seat 201c which divides the whole passageway into a first portion 201' including the cavity 201e in the bottom of middle section between the valve seat and the outlet 201b and the second portion 201" between the inlet 201a and the valve seat 201c. Also in this passageway 201 that extends in the bottom of the middle section 200b of the valve body is a valve seat 201d leading to a drain passageway 203 as will be described.

The valve seats 201c and 201d are in vertical alignment and on the vertical axis therethrough in the middle section 200b there is from bottom to top, the valve seat 201d, a first valve element drain cavity 203, a reduced bore 204 for receiving a first valve element 206 as will be described, and a first valve element pressure actuator chamber 205.

The first valve element generally indicated at 206 has a valve stem or bolt 207 having an integral head 207a at the lower end, an attached circular plate or washer 207b spaced in from 207a and a threaded upper end to receive a nut 208. About the lower end of rod 207 and about plate 207b is formed in a vulcanized manner a valve means 206a at the bottom to cooperate with valve seat 201c, a second valve means 206b thereabove to cooperate with valve seat 201c, a sleeve 209 of stainless steel is received over rod 207 and extends up through the bore 204 and through an O-ring seal 204a held by a washer 204b. The sleeve 209 seats against the bottom of a specially shaped lower disc or washer 304 as the bolt 207 passes up therethrough a pressure actuator portion 302 of combined gasket 300 receiving thereover a specially shaped top disc or washer 305 secured under nut 208.

The specially shaped lower washer or piston 304 is of brass material circular in shape with an upturned rim 304a, a central aperture 304b and a plurality of circumferentially spaced apart apertures 304c to act as drains so that no water will become trapped.

The pressure actuator portion of combined gasket 300 is indicated generally at 302 which is molded with a fold part to provide for flexing up and down and to impart a biasing action to return the portion to its normal up position of rest. The pressure actuator portion 302 of the combined gasket and pressure actuator 300 is made up of a cylindrical vertical outer wall 302a, a bottom annular portion 302b extending inwardly towards a central aperture 303a, a vertically extending middle cylindrical wall 302c, spaced inwardly and concentric with wall 302a, a top annular portion 302d, an inner vertically extending cylindrical wall 302e joining at its bottom with a bottom 302f that is disc shaped and being molded about a central disc or washer 303 to afford rigidity to the bottom 302f. The portions 302a, 302b and 302c form an outer U-shaped in cross section portion with an open top while the common wall 302c and the portion 302d and vertical wall 302e form an inner inverted U-shape in cross section portion with an open bottom. These two U-shaped portions flex as shown in partially distended position in FIG. 7 and have inherent springiness to bias the pressure actuator back to its normal position when fluid actuating pressure applied to the top is removed.

The upper specially shaped washer 305 is of dish shape having a circular bottom 305a with a central aperture 305b therein to receive the top end of bolt or rod 207, an upwardly and outwardly slanting vertical wall 305c with spaced apart draining apertures 305d therein, and a top annular horizontally extending flange 305e.

The fluid pressure supply to actuate the fluid pressure actuator 302 to reciprocate the first valve 206 and seat and unseat the valve means 206a and 206b at the bottom thereof will be described later.

Also formed in the combined gasket and pressure actuator generally indicated at 300 is a drain valve actuator portion 301 formed with an inverted U-shaped in cross section formed up annular biasing portion consisting of outer vertical wall 301a, top annular portion 301b and vertical inner wall 301c which at its bottom joins integrally with the disc-like bottom 301d. This pressure actuator portion is positioned above a drain cut-off valve pressure actuator chamber 212 to actuate a drain cut-off valve generally indicated at 213 as will be described.

Figure 7:
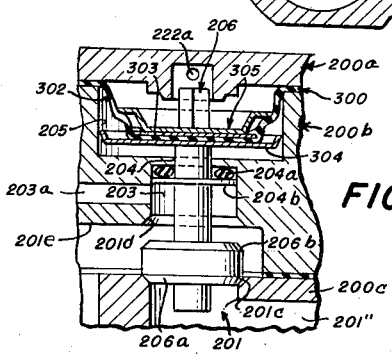
FIG. 7 is a fragmentary of the larger diaphragm actuator for the double acting reciprocating valve of FIG. 6 in the down position of the diaphragm and the valve actuated thereby.

In FIG. 7 first valve 206 is shown in its pressurized position where it has moved down so that the first valve means 206a thereon seats on seal 201c to close off passage 201″ from portion 201e of passage 201′. Passage 201e is opened to communicate with the drain passages 203 and 203a since the second valve means 206b on the first valve 206 has been moved down off of its cooperating seat 201d. Pressure besides acting on the pressure actuator 302 is acting on the top of the second valve means 206b and the portion centrally thereof to hold valve 206 down.

It is desired that there be no communication between the drain passageway 203 and the bottom portion of pressure actuator cylinder cavity 205 below the actuator 302 therein and thus there is provided a seal assembly about the sleeve 209, which includes an O-ring 204a and retainer washer 204b shown in FIGS. 6, 7 and 8.

Still referring to FIG. 6 there is connected to the drain cavity 203 in the middle section 200b of the valve body a drain passageway 203a which leads to the bottom of a drain cut-off valve pressure actuator chamber 212 that extends vertically in the middle section 200b and receives the drain cut-off pressure actuator piston generally indicated at 213. The piston assembly 213 includes a reduced diameter rubber washer 214 which is suitably held assembled with the cut-off actuator 213 by means of a bolt and nut assembly generally indicated at 214a and which seats against the bottom of chamber 212 to close off the drain entry passageway 203a. A compression spring 215 is positioned in the bottom of the chamber 212 and seats around the member 214 against the bottom of actuator 213 and urges it upward.

Also shown in FIG. 6 is a vertically disposed screen-receiving cavity or well 216 which extends through the middle section 200b and has a lower opening 216a communicating with the hard water supply passageway second portion 201″. The screen-receiving passageway 216 receives a cylindrically shaped screen 217. The upper end of screen 217 extends into an internally threaded aperture 216b in upper section 200a. Threaded aperture 216b receives a special securing cap screw 217a that extends at its reduced lower end into the top of screen 216. A sealing washer 217b seals cap 217a in section 200a. Control pressure water and bypass water, as will be explained later, passes through this screen 217 and passes through the cavity connected therewith, as indicated at 216c in FIG. 4 in the middle section 200b of the valve body.

Figure 3:
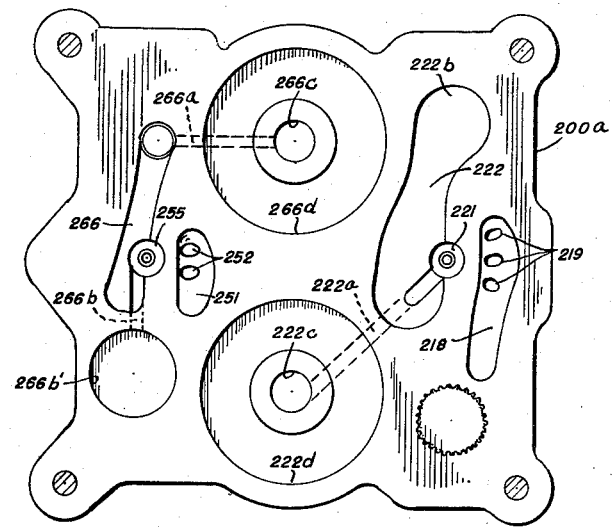
FIG. 3 is a bottom view of the top section of the body of the valve assembly along line 3—3 of FIG. 2.
Figure 4:
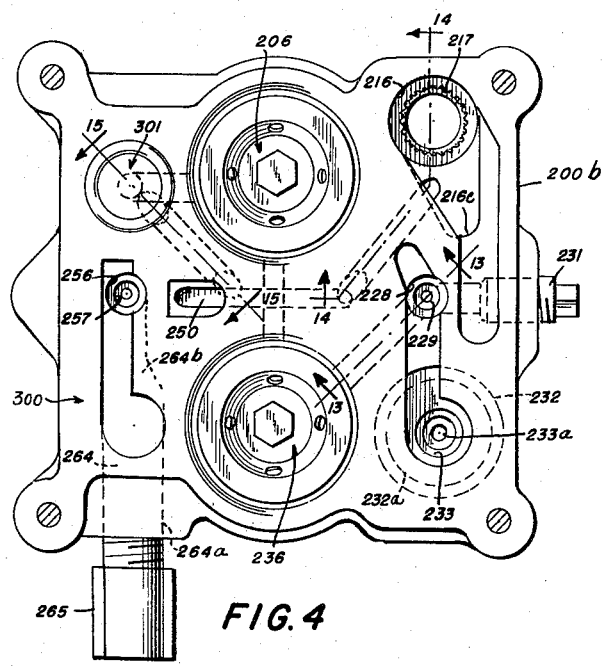
FIG. 4 is a top view of the mid-section of the body of the valve assembly along line 4—4 of FIG. 2 with the gasket in place.
Figure 5:
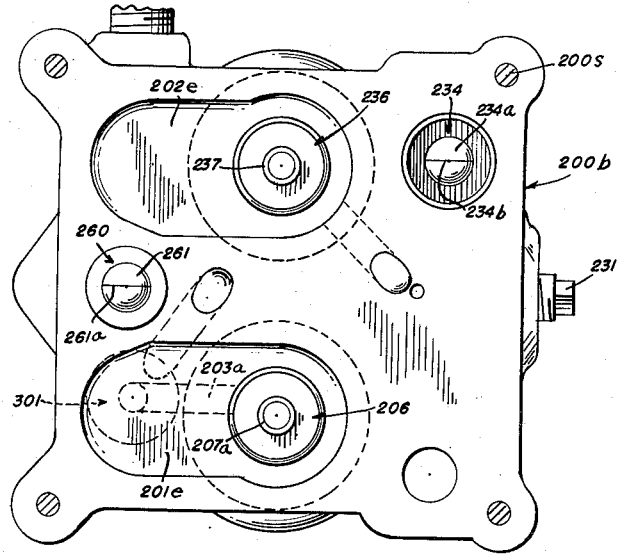
FIG. 5 is a bottom view of the mid-section of the body of the valve assembly along line 5—5 of FIG. 2.
Figure 10:
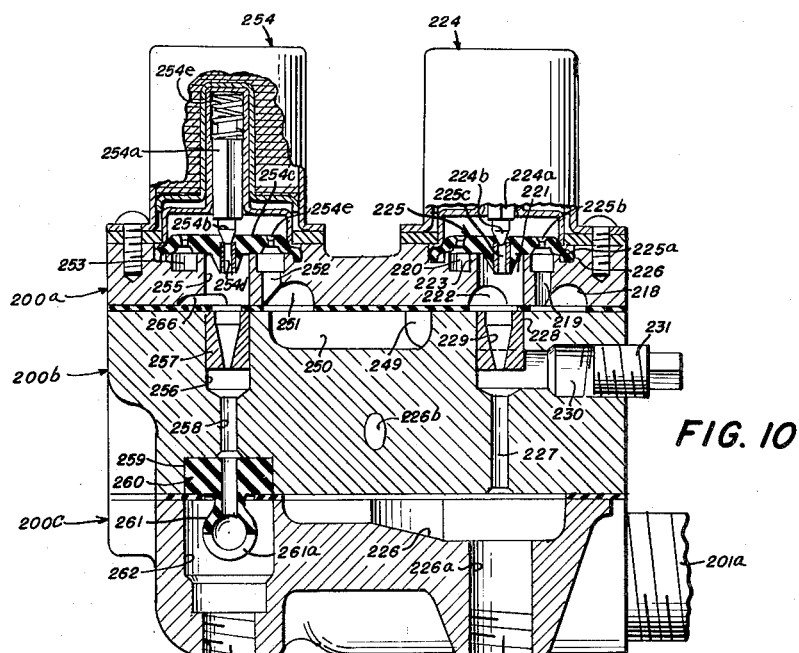
FIG. 10 is a vertical section view along line 10—10 of FIG. 1.

Referring to FIG. 3 a first control pressure channel way comprises the channel way 218 formed in the bottom of the top section 200a which is generally oval and elongated in shape and extends over to and above an end part of the cavity 216c middle section 200b, see FIG. 4, to receive water therefrom and conduct it through the three vertical channel ways 219 as shown in FIG. 3 and one in section in FIG. 10 at 219 to an annular open face cavity 220 in the top of valve body 200a, thence to the coaxial passageway 221 within annular cavity 220 in the top section 200a. Vertical passage 221 is in communication with the balance of the first control pressure channel way 220, as indicated in FIGS. 3, 6 and 10. It will be noted in FIGS. 3 and 10 that an elongated shallow cavity or channel way is formed in the lower face of the top section 200a and it receives fluid pressure from vertical passage 221 with which its outer edge portion is in communication. Also in FIG. 3, a passage 222a is drilled or formed in the top section 200a to connect cavity 222 and 221 with a cylindrical recess 222c in top section 200a to feed fluid control pressure to the top of first valve element pressure cavity 205 and to the annular cavity 222d formed in 200a concentric about recess 222c to feed pressure to the first valve element 206 and the pressure actuator 302 of the combined gasket and pressure actuator 300.

The annular cavity 220, see FIG. 10, and the coaxial inner cylindrical vertical passage 221 are separated by an annular wall 223, the top of which forms a seat to receive a standard type of solenoid valve generally indicated at 224. The solenoid valve 224 has an armature 224a therein with a needle-like valve point 224b which seats in the center of a composition diaphragm generally indicated at 225 having a depending rim portion 225a received within an annular recess 226 in section 200a. The diaphragm 225 has spaced apart vertically extending small apertures 225b extending through the rim thereof so water under pressure may pass upward therethrough from the annular cavity 220 to the top of the diaphragm 225 to pressurize the top and hold it seated on the annular seat 223 when the needle valve 224b is seated to close off the orifice 225c which extends axially through the center of the diaphragm 225. Thus, when the solenoid 224 is energized to lift the armature 224a, the needle-like valve point 224b is lifted and orifice 225c is opened so that the pressure is reduced above the diaphragm 225 to upset the prior pressure balance above and below and the diaphragm 225 is lifted up by the pressure differential acting in annular cavity 220 therebelow and water under pressure flows over the valve seat 223 into the coaxial inner passageway 221 and thence to the cavity 222.

Figure 9:
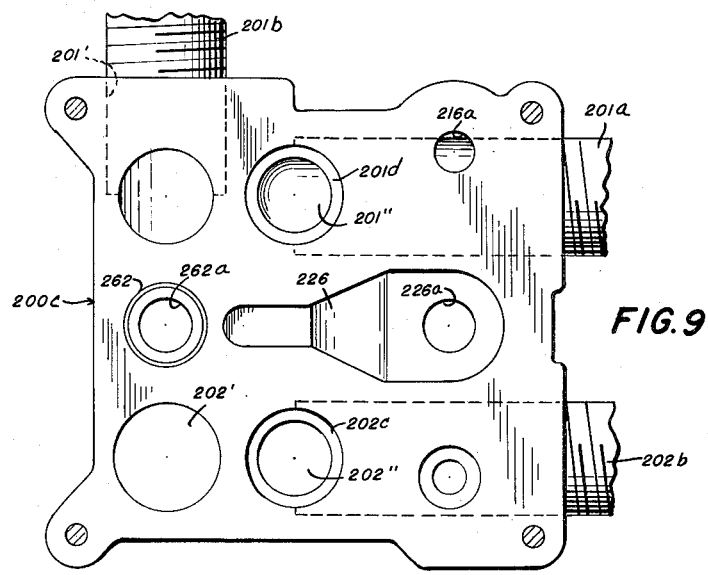
FIG. 9 is a top plan view of the bottom section along line 9—9 of FIG. 2.
Figure 15:
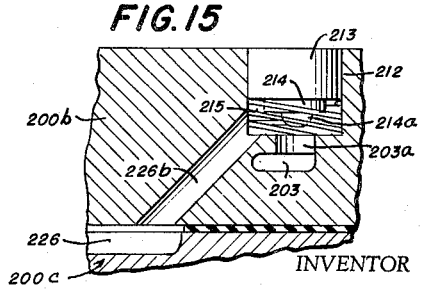
FIG. 15 is an enlarged vertical sectional view along line 15—15 of FIG. 4 showing the drain cutoff valve adjacent the first valve element and certain drain passageways.

Referring to FIG. 10, a common drain cavity is indicated at 226 in the bottom section 200c of the valve body and this cavity leads at one end to a vertical drain connection 226a to which a drain line may be attached. This drain cavity 226 is also shown in FIG. 9 which is a top plan view of the lower section 200c. In line with this drain cavity and the drain connection 226a therein, is a vertical passageway 227 leading to a jet cavity 228 thereabove which communicates with the passageways 221 and 222 and is axially in line and below the orifice 225c controlled by the solenoid valve 224. Housed in the orifice cavity 228 is a restricting jet orifice 229. A passageway or bore extends transversely to the passageway 228 and communicates therewith as indicated at 230 in the body 200b and receives a threaded plug 231. A secondary suction drain line may be attached to the aperture 230 when the threaded plug 231 is removed. When the solenoid valve 224, the first control valve means, is actuated by the control apparatus and jet 229 is placed in operation it directs a stream through the drain 226 and 226a in alignment therewith and places a suction on the common drain cavity 226 and all of the other drains to be described that are connected thereto. The pressurizing jet 229 also pressurizes the channel ways thereabove so as to apply pressure to the first valve element pressure actuator 302 to move the first valve element 206 down against the built in biasing portion 302a, 302b, 302d and 302e thereof, so that the first valved means thereon 206a seats against the seat 201c in the pressure supply passageway to close off the water supply and to interrupt the normal service operation of the valve assembly. In so doing, the second valve 206b unseats from its seat 201d to connect the section 201', the first section of the supply passageway 201, to the drain cavity 203 and drain passageway 203a. Reference to FIG. 15 shows the drain cut-off drain actuator 213 and the rubber valve element 214 associated therewith which closes off the drain passageway 203a in the bottom of the drain cavity 212. Connected to the drain cut-off valve pressure actuator cavity 212 in the valve body mid-portion 200b is a drain passageway 226b leading to the common drain cavity 226 in the bottom section 200c of the valve body. Thus, as will be described later when the cut-off drain actuator 213 is pressurized on top it moves down against the spring 215 and the rubber valve disk 214 seats against the bottom of the cavity 212 to close off the drain passage 203a so as to interrupt the drain connection from 203a through the cavity 212 to the drain passageway 226b and thence to the common drain 226.

Referring back to FIG. 3, it will be noted that one arm 222b of the portion of the first pressure control channel way 222 leads so as to be in position over a vertically extending first check valve cavity 232, see FIGS. 4 and 11, in the middle portion 200b of the valve body.

The vertically extending cavity 232 has a number of stepped bore portions therein as indicated at 232a, the largest diameter portion, a next portion 232b, the smallest diameter portion, and communicating therewith are two additional stepped larger portions 232c and 232d. A restrictor member generally indicated at 233 is mounted in the cavity 232a and has a throttling throat 233a therein which is axially above a check valve generally indicated at 234 mounted in the cavity portion 232d. Check valve 234 is of rubber and has a bulb portion 234a with a slit 234b across the bottom of the bulb portion which when pressure from the service line 202 and particularly the second portion 202" therebelow acts thereagainst closes the portions of the bulb 234a forming slit 234b and prevents flow upward therethrough. The check valve 234 is held in place by a retainer ring 235. This check valve 234 is a pressure controlling valve in a by-pass line formed by the passageway 222 and 222b leading from the pressure supply 201" shown in FIG. 6 and described above which provides a communication over to the service line portion 202". This by-pass provides backwash pressure under throttled pressure conditions which passes through the service line in reverse direction to the bottom of a softener tank (not shown). Check valve 234 and the by-pass in which it is positioned provides decreased pressure supply for the service line portion 202" and the house connection connected at 202b when the valve assembly is carrying out regeneration functions, including backwash and rinse. Thus, the service line portion 202" to supply water to the house is never without pressure.

Figure 12:
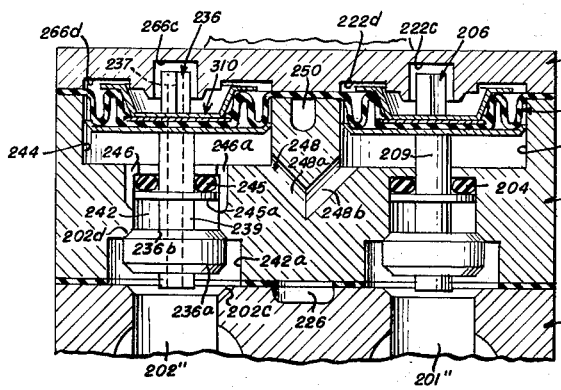
FIG. 12 is a fragmentary vertical cross section view along line 12—12 of FIG. 1 showing the two valve elements thereof and certain passageways.

Reference is now made to the service passageway 202 and the second valve element assembly 236 particularly shown in FIGS. 11 and 12. The second valve element assembly 236 is made up the same as the first valve element 206 having a bolt or stem 237 threaded at one end to receive a nut 238, a first valved means 236a which is of rubber or the like that seats against valve seat 202c and divides the service passageway 202 into a first portion 202' including the cavity 202e in the bottom of section 200b in the section 200c and a second portion 202". Also on the first valve element 236 is an oppositely positioned second valved means 236b and it seats against the seat 202d. Completing the second valve element 236 is a sleeve 239, a second valve pressure actuator 310.

The second valve element 236 is received within the middle section 200b of the main body in vertical cavities consisting of the drain cavity 242 above seat 202d and drain cavity 242a therebelow, a stem aperture 243 thereabove which receives and guides the sleeve 239 of the second valve element 236 and a third cavity consisting of the second valve element pressure actuator cavity 244. Received in the upper end of the drain cavity 242 is an O-ring 245 held in by a washer 245a therebelow and through which the sleeve 239 reciprocates. In FIG. 12 is shown two vertically extending spaced apart bores 246 and 246a extending in section 200b to form a communication from the bottom of the cavity 244 into the drain cavity 242. The built in biasing action in the combined gasket and pressure actuator 300 at the second pressure actuator 310 urges the second valve element 236 upward so as to close the second valved means 236b against the seat 202d. So also the pressure in lines 201" and 202" acts on the valves 206 and 236 at their bottom ends in service position to urge them up.

Figure 13:
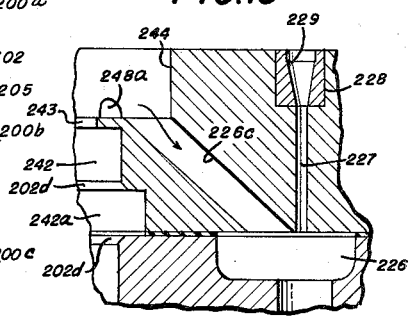
FIG. 13 is a vertical cross section view along line 13—13 of FIG. 4 on an enlarged scale showing a drain passageway to the second valve element.

Reference to FIGS. 11 and 13 shows a drain passageway 226c leading from the cavity 244 underneath the second valve element pressure actuator 310 to the common drain cavity 226.

Also in FIG. 12 there is shown an interconnecting passageway 248 which consists of two branches 248a and 248b which are bored downwardly at an angle of about 45° so as to meet and which interconnect the cavities 244 and 205 below the respective first and second valve element pressure actuators 302 and 310. This interconnecting passageway 248 drains off cavity 205 below the pressure actuator 302 therein to release any built-up pressure to the cavity 244 below the pressure actuator 310 that has the drain connection 226c as shown in FIG. 13.

Figure 14:
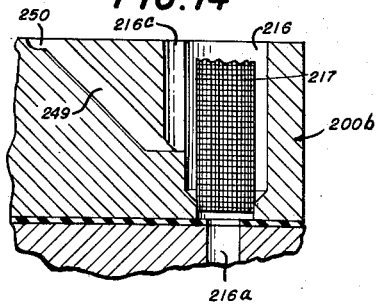
FIG. 14 is an enlarged vertical sectional view along line 14—14 of FIG. 4 showing a strainer in the supply line well and certain takeoff passages leading from the well.

Control pressure for actuating the second valve element 236 and the drain cut-off actuator 213 will now be described. Referring to FIG. 14 the pressure supply strainer well 216 and portion 216c thereof are connected by passageway 249 in the middle section of the valve body 200b with an elongated cavity 250 formed in the upper face of the middle section 200b as shown in FIGS. 4, 10 and 14. This cavity 250 extends across the valve body 200b, as shown best in FIG. 4, between the first and second valve elements generally indicated at 206 and 236. Reference to FIG. 3 depicting the top section 200a where the bottom face thereof is viewed shows a cavity 251 serving a similar purpose to that of cavity 218 and two vertical apertures 252 extend through the top section 200a shown in FIG. 10 in a similar manner to the apertures 219 for cavity 218. The upper ends of the apertures or bores 252 terminate in an annular cavity 253, see FIG. 10, similar to cavity 220 for the pressure actuator control valve 224. A solenoid actuated second control valve 254 like the valve 224 controls flow from the annular channel 253 to the vertical passage 255, the latter passage being similar to the passage 221 in the previously described valve arrangement operated by the solenoid 224. In the middle section 200b of the valve body and axially in line with the passageway 255 is a jet receiving aperture or well 256 within which is received a pressurizing jet 257. The base of the jet well 256 is connected by a vertical bore 258 with a cavity 259 in the bottom face of the middle section 200b to receive a check valve 260 similar to the check valve 234 previously described. This check valve 260 has a bulb portion 261 at its bottom end which is slotted at 261a in its lower half. The bulb portion 261 is received within the vertical aperture 262 extending in the bottom section 200c of the valve body which has a threaded lower end or outlet 262a that is connected with a softener tank (not shown) just above the mineral bed upper level.

Referring to FIG. 4, there is shown a side passageway 264 in the bottom section 200b of the valve body. This passage 264 has a threaded external end at 264a and a reduced throat portion 264b at the inner end which communicates with the bottom of the jet well 256 below the jet 257, as shown in FIG. 10. Connected at the outer end 264a of the passageway 264 is a fitting 265, see FIGS. 1 and 2, that is adapted to receive a rubber or plastic tube (not shown) which leads to a common brine suction and water replacement line in the brine tank (not shown).

It will be seen in FIG. 10 that the armature 254a in the solenoid actuated valve 254 has a needle valve end 254b cooperating with the orifice 254d in the diaphragm 254c of the valve assembly 254. A spring 254e urges the armature 254a and the needle valve 254b thereon into closing position with the orifice 254d in diaphragm 254c. The small vertically extending orifice 254e in the diaphragm 254c permits equalization of pressure above and below diaphragm when the orifice 254d is closed off by valve 254b. When the solenoid 254 is energized the armature 254a is retracted against the spring 254c and the pressure balance is upset about the diaphragm 254c so as to permit control water under pressure to travel from the channel 253 to the vertical passageway 255 and then to the jet 257 as will later be described.

Referring again to FIG. 3, there is shown a second control pressure channel way portion 266 similar to the first channel way portion 222. Channel way 266 is elongated and is in communication with the bottom end of the vertical passageway 255, see FIG. 10. One end of passageway 266 is connected by a channel way 266a drilled in top section 200a to communicate with an axially extending cavity 266c receiving the top end of the second valve element 236. A concentric cavity 266d in top section 200a is in communication with cavity 266c and receives pressure to pressurize the pressure actuator 310 of the second valve 236. The other end of the cavity 266 is connected by a drilled passage 266b to a cavity 266b' in top section 200a to supply pressure to the drain cut-off pressure actuator 213. The combined gasket and pressure actuator generally indicated at 300 has formed therein a drain cut-off valve pressure actuator portion generally indicated at 301 as previously described with reference to FIG. 8. This portion 301 of the gasket 300 applies pressure to the top of cut-off valve piston 213 when pressurized. The portion 301 has a built in biasing feature in the shaped portions 301a, 301b, 301c and 301d. Thus, the jet 256, when pressure is applied thereto, backs up pressure in the passageway 266 so as to apply control pressure to both the second valve element 236 and to the drain cut-off valve pressure actuator 213.

*Operation of valve assembly*

The operation of the valve assembly 200 is analogous to that as explained in my copending application Serial No. 707,267, filed January 6, 1958.

Figure 1:
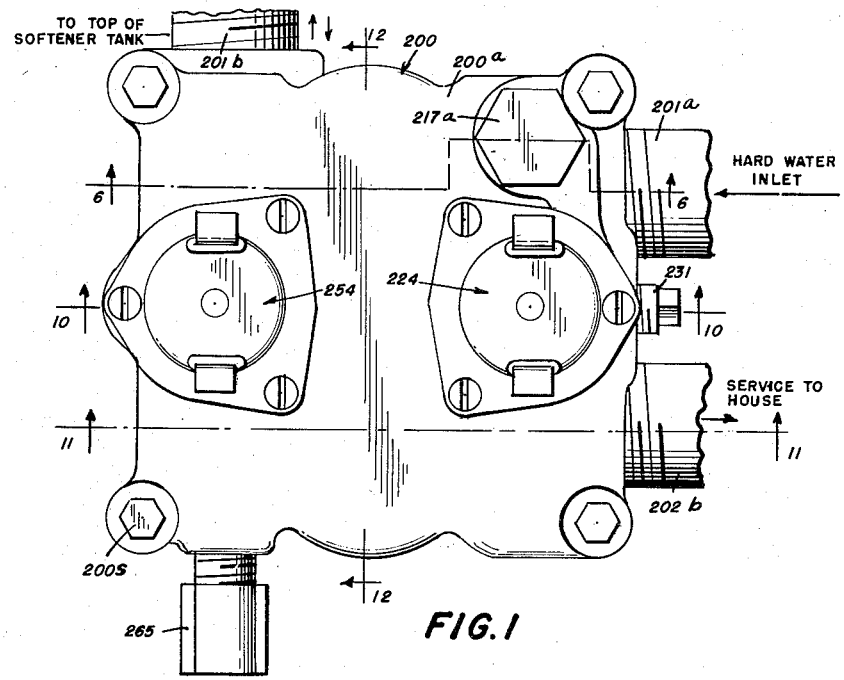
FIG. 1 is a top plan view of the valve assembly.

In the service or softening operation the hard water supply which is connected at 201a, as diagrammatically shown in FIGS. 1 and 6, passes through the service passageway 201, past the valve seat 201d, out through the chamber portion 201e and to the outlet connection 201b which is connected to the top of a softener tank (not shown). In the softener tank S, such as shown in my copending application Serial No. 707,267, filed January 6, 1958, water passes downward through the mineral bed M where treatment and softening takes place by the ion exchange principle out the bottom of the softener tank S and thence up to the valve assembly 200 where it enters at 202a into the service passageway 202, past the valve seat 202c and thence out to the house service connection 202b.

A timer mechanism and circuits as shown in my copending application Serial No. 707,267, filed January 6, 1958, are utilized with this valve assembly 200 to properly actuate the solenoids 224 and 254 for the first valve element 206 and the second valve element 236, respectively. It will be noted that the valve elements 206 and 236 are biased upwardly as is the by-pass cut-off operator 213. In the case of the first valve element 206 and a second valve element 236 water pressure also acts on the first valved means 206a for the first valve element 206 and on the first valved means 236a on the second valve element 236. Spring 215 under cut-off valve piston 213 holds the valve washer 214 off of the bottom of well 212 so that the drain is open when the pressure actuator 301 therefor is not pressurized.

*Backwashing*

Backwashing is an upflow operation that loosens a mineral bed and removes foreign deposits on such mineral material in a softener tank. The first solenoid actuator 224 is energized and the armature 224a thereof is raised off its seat so as to apply the first control pressure which follows the path from the supply pressure line portion 201", passage 216a, through screen 217, the screen well 216, the first control pressure channel way portion 218 in communication with the screen well 216 at 216c, through vertical passageways 219, annular passage 220, thence under the diaphragm 225 and into the vertical passageway 221, pressurizing the jet 229 and placing a suction on the common drain 226—226a. Pressure in the portions 222a and 222b of the first control pressure channel way 222 applies pressure to the first valve element 206 causing it to move down against the built in biasing action in the portion of the combined gasket and pressure actuator 300 so that the first valved means 206a thereon seats and closes against the seat 201c therebelow and interrupts supply passageway 201 and water flow therethrough. As the first valve element 206 moves downward, the second valve means 206b thereon unseats from its seat 201d and opens up the drain 203—203a to the topside of the softener tank as it is connected to passageway first portion 201' and 201b. Water for backwashing comes from the first control passageway portion 222b that is also pressurized when solenoid 224 is actuated, passes down through the first check valve 234, through the service passageway 202 in the valve body and past the valve seat 202c and thence through passage 202c and 202a to the bottom of the softener tank. This by-pass water pressure is governed by the by-pass through the check valve 234 to supply adequate backwash up through a mineral bed in a softener tank.

Any pressure on a softener tank is relieved through the drain 203a which passes through the drain chamber 212 to the drain passage 226b and thence to the common drain 226. The action of the pressurizing jet 229 places a suction on the common drain 226 and thus assists in removing the backwash water. Since the pressure is applied on the drain to form a suction, the drain can be at a higher level than the valve assembly 200 and still move drain water out of the system.

In this operation of backwashing since there is pressure on the softener tank, pressure feds up therethrough to connection 262a, see FIG. 10, in the valve body so as to apply pressure and close the slot 261a of bulb 261 of the check valve 260. This check valve 260 seals off any movement of water upward therethrough.

Brine and slow rinse

Following the backwash, a timer control mechanism adapted to be used with this valve assembly causes the second solenoid, namely, solenoid control valve means 254 to be energized. The first solenoid 224 is still energized. On energization of solenoid 254 the second control pressure channel way 266 is pressurized. The second control pressure channel way 266 receives a water pressure supply from the pressure supply line portion 201a, the screen well 216, passageway 249 in the valve body 200b, see FIG. 14, cavity 250, cavity 251, vertical passageways 252, annular cavity 253, the water then passes under the diaphragm of solenoid valve 254 and thence down through the passage 255 whereupon jet 257 is pressurized as is the second control passageway 266. The second control passageway 266 pressurizes each of its ends 266a and 266b so as to move the second valve element 236 downward and also move the drain cut-off actuator 213 down so that the rubber washer 214 thereon closes off the drain passage in the bottom of the drain well 212. When the second valve element 236 moves downward the first valved means thereon 236a closes against seat 202c and shuts off any by-pass water and at the same time the second valve means 236b moves down in unison therewith to uncover its seat 202d and provide communication from the first portion of the service passageway 202' to the drain cavity 242. As viewed in FIG. 12, drain cavity 242 for the second valve 236 communicates through the vertical passages 246 to the bottom of the second valve pressure actuator cavity 244 and then by the drain 226c, see FIG. 13, to the common drain 226. This action starts a brine operation that is followed by a slow rinse operation. The pressurizing jet 257 places a suction on the line 264 in the valve body, see FIG. 4, which is attached to the fitting 265 and to the bottom of a brine tank such as shown in my copending application Serial No. 707,267, filed January 6, 1958, leading to a common brine and replacement water line connected to the brine tank and to fitting 265 on the valve assembly 200, see FIGS. 2 and 4. Brine is drawn up from the bottom of the brine tank and is discharged through the passage 262a below jet orifice 257 and thence to the top of the bed of minerals in the softener tank. The drain water of the brining operation passes out the bottom of softener tank and through the connection 202a, see FIGS. 11 and 12, the first portion 202' of the service passageway 202, past the second valve means 236b on the second valve element 236, past seat 202d, through 242, apertures 246 and 246a, bottom of well 244, and out through the drain passage 226c, see FIG. 13, to the common drain 226. This common drain 226 is still being augmented by the pressurizing jet 229 so that the drain is given an ejector action through the connection 226a therebelow the orifice passageway 227 below the first jet orifice 229.

As the brine level in the brine tank drops, suitable controls (not shown here) shown in my copending application Serial No. 707,267, filed January 6, 1958, causes the first solenoid 224 to be deenergized and the first valve element 206 to move to upward position. A suitable holding circuit (not shown) maintains the second solenoid 254 energized so that the second valve element 236 is still held in downward position and the service passageway 202 is still closed off by the first valved means 36a on the second valve element 236.

Fast rinse

First valve element 206 is in the up position and second valve element is in down position. Pressure is now applied through the supply passageway 201 in the valve body, past the valve seat 201c and thence to the top of the softener tank. With this pressure applied at the top of the softener tank, a suitable connection to the tank leading to just above the mineral bed therein and to 262a is pressurized and the check valve 260 thus is pressurized closed so as to prevent water from passing upward therethrough. Pressure is still applied to the jet 256, and it now discharges through what previously acted as the brine suction line 264, through fitting 265, and thence to the brine tank so as to now act as a water replacement line to place water into the bottom of the brine tank. A suitable float circuit is provided so that when the replacement water reaches the proper level the control circuits to the solenoids are restored. As the full pressure supply from the supply line 201 is applied to the top of the softener tank, it provides a fast rinse through the mineral bed therein, which fast rinse is drained off through the drain provided by the second valve element 236 which leads to the drain line 226c to the common drain 226. Upon restoring the circuits to service condition of non-energization, the solenoid of the valve means 254 is deenergized, and the second valve means 236 returns to normal or service position whereupon the second valve means 236a thereon moves up off seat 202c restoring the communication between the first portion 202' and the second portion 202" of the service passageway 202 whereupon soft water now being conditioned through passing through the mineral bed passes through the service line 202 to the house connection 202b.

It is to be noted that the slow rinse followed by the fast rinse provided by the flexibility of the valve asembly carries out the rinsing of the minerals in a softener tank after they have been rehabilitated by the brine cycle in such a manner that the mineral bed is regenerated to handle and to also cope with iron-bearing waters.

The valve assembly 200 according to this invention as illustrated and described as to its operations uses only two solenoid actuated first and second valve elements each having first and second valve means thereon. There is a minimum of operating parts; nevertheless the appropriate upflow backwash is supplied for the minerals as prescribed by the mineral manufacturer; a slow brining which is a downflow operation under pressure controlled conditions is applied to the mineral bed; a slow rinse that is downflow and controlled under reduced pressure is maintained; and a fast rinse that is downflow under full pressure is provided.

The use of the combined gasket 300 and pressure actuator portions generally indicated at 302 for the first valve element 206, 310 for the second valve element 236 and 301 for the cut-off drain valve 214 provides for free action of the valves with no sticking of the pressure actuators. In this valve assembly the actuation of the first, second and drain cut-off valves is without differential pressure and thus positive and very reliable free action is assured with a minimum of wearing of parts and a freedom from leakage.

It is to be noted that the cross sectional size of aperture 246 and 246a, see FIG. 12, bears a ratio to the cross sectional area of drain aperture 226c such that the pressure under the first pressure actuator 302 and the second pressure actuator 310 is equal to less than 60% of the main supply pressure during the fast rinse cycle. When the second solenoid 254 is deenergized the pressure on top of the first pressure actuator 302 has already been relieved and as soon as the second pressure actuator 310 moves up to seat 236b against seat 202d any pressure remaining under the first pressure actuator 302 in chamber 205 and under the second pressure actuator 310 in chamber 244 is relieved to drain passage 226c.

Figure 8:
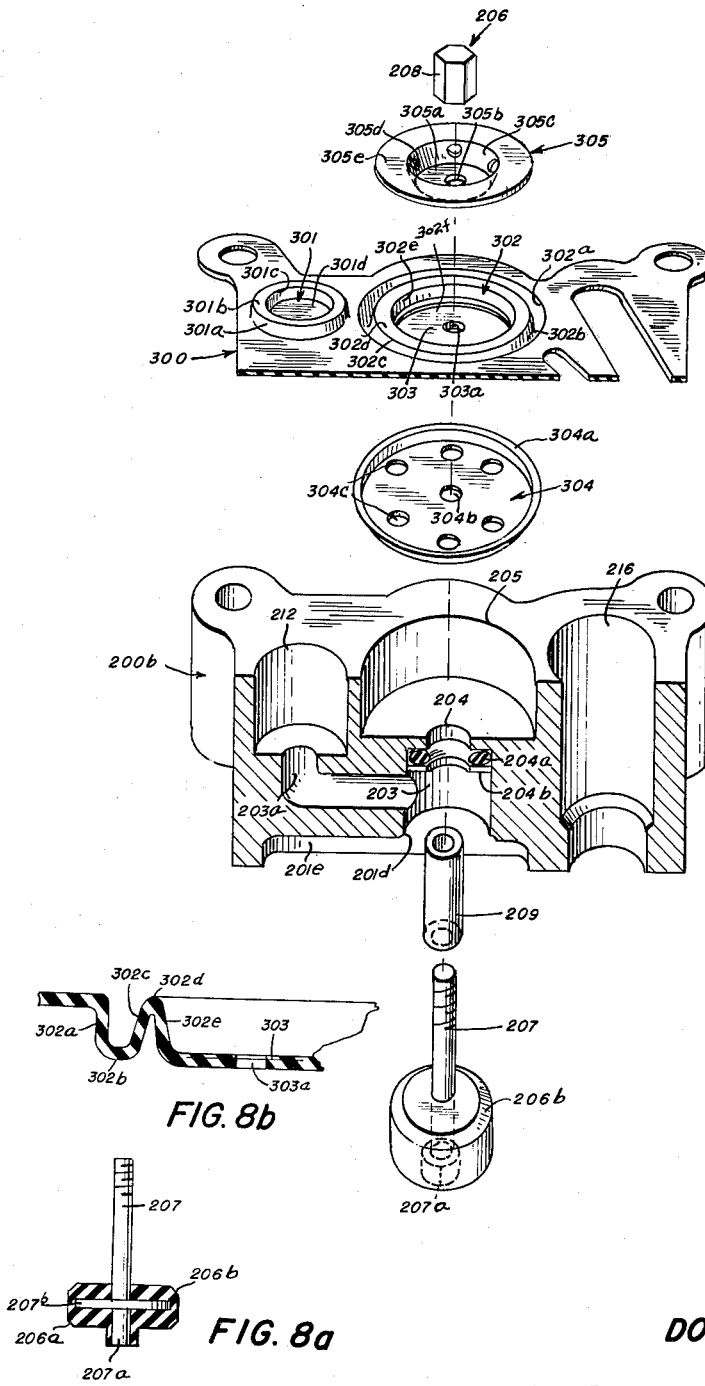
FIG. 8 is an exploded isometric view of the rear half of the mid-section and the unitary gasket and reciprocating valve actuator diaphragm together with the parts of the larger rear reciprocating valve.

During the fast rinse when drain water pressure is in the chambers 205 and 244 below the pressure actuators therein, the top retainer or washer elements 305, as illustrated in FIG. 8, for the first and second pressure actuators 302 and 310 receives the force of the pressure therebelow and contains the diaphragm portion of the pressure actuators and prevents them from blowing out.

While solenoid actuated valves have been illustrated to supply the control pressure to the valve actuators manual or mechanical valves can be used to supply the control pressure. So also electric or mechanically operated cams can be used to move the first and second valve elements 206 and 236.

This valve assembly may equally as well be used with pressure brining systems or in a non pressure sealed brine tank system in water softener apparatus. Without adjustment the valve assembly will work on pressures ranging from about 2 to 200 pounds per square inch and due to this it can take advantage of all water systems. In use of this valve assembly the pressure controls the rates of flow and volume.

In the fast rinse cycle of operation provided by this valve assembly there is a large volume of water that drains through the mineral bed that eliminates or renders dormant the salt and iron pockets which do not back wash out or do not exchange by the brine action and thus there is no passing of a slug of iron into the house supply after regeneration. The fast rinse action packs the mineral bed for better filtration of a turbid water supply. The fast rinse accorded by this valve assembly permits the water pressure to govern the volume and velocity of water passing through the mineral bed so as to condition the mineral to optimum form.

I claim as my invention:

1. A fluid distribution valve comprising a valve body having a top section, a middle section and a bottom section detachably connected, a first gasket means separating the top and middle sections, a second gasket means separating the middle and bottom sections, said gasket means being of flexible and resilient sheet material, said valve body having a fluid supply passageway with an inlet portion in the bottom section, a supply passageway first valve seat in the bottom section between the inlet portion and middle portion of the supply passageway; a drain cavity in the middle section connected to said middle portion of the supply passageway and having therebetween a second valve seat; a drain cavity in the bottom section having a discharge opening to the outside of said lower section; a drain passageway in the middle section connecting said drain cavity in the middle section with the drain cavity in the bottom section; a fluid pressure actuator chamber in the middle section for a drain cut-off valve pressure actuator; a drain cut-off valve in the drain passageway of the middle section and provided with a fluid pressure actuator mounted in said fluid pressure actuator chamber therefor; said first gasket means having a pressure transmitting portion therein lying over said pressure actuator chamber for the drain cut-off valve to apply pressure to said pressure actuator therein, said pressure transmitting portion having an annular U-shape in cross section biasing portion surrounding a central disc pressure transmitter; a first valve element pressure actuator chamber in the middle section; a first valve element movably mounted in the middle section and having a pressure actuator in the pressure actuator chamber, a first valved means cooperating in down position to seat on said first valve seat in the supply passageway and close same off, and a second valved means cooperating in up position of the first valve element to seat on said second valve seat in the middle section to close off said drain cavity connection with said drain passageway in the middle section; said pressure actuator for the first valve element comprising a portion of said first gasket means that has a first valve element pressure transmitting portion therein housed in and extensible in said pressure actuator chamber and connected to said first valve element, said pressure transmitting portion for the first valve actuator having at least one annular U-shape in cross section biasing portion surrounding and integral with a central disc pressure transmitter connected to said first valve element; a fluid pressure well in said middle section connected at one end with the inlet portion of the supply passageway; a first jet orifice and passageway in said middle section having a supply end terminating in the top of said middle section and a discharge terminating in said drain cavity in the lower section to place a suction thereon; a service passageway in said body having an inlet portion in the bottom section, a portion in the middle section and an outlet in the bottom section; a service passageway first valve seat in the bottom section between the inlet portion and the middle portion of the service passageway; a service drain cavity in the middle section connected to said middle portion of the service passageway and having therebetween a second valve seat; a second valve element pressure actuator chamber in the middle section; a second valve element movably mounted in the middle section and having a pressure actuator in the pressure actuator chamber therefor, a first valved means cooperating in down position to seat on said first valve seat in the service passageway and close same off, and a second valved means cooperating in up position of the first valve element to seat on said last mentioned second valve seat in the middle section to close off said service drain cavity; said pressure actuator for the second valve element comprising a portion of said first gasket means that has a second valve element pressure transmitting portion therein housed in and extensible in said second valve element pressure actuator chamber and connected to said second valve element, said pressure transmitting portion for the second valve actuator having at least one annular U-shape in cross section biasing portion surrounding and integral with a central disc pressure transmitter connected to said second valve element; a passage in the middle section connecting the service drain cavity with the bottom of said second valve element pressure actuator chamber below the pressure actuator therein; an interconnecting passageway between said pressure actuator chamber in the middle section below the pressure actuators therein; a drain passageway in the middle section connecting the bottom of the second valve element pressure actuator chamber with the drain cavity in the bottom section; a by-pass passageway in the middle section discharging at one end to the outlet end of said service passageway in the bottom section; a check valve in said by-pass passageway preventing flow from the service passageway outlet portion to said by-pass passageway and controlling the pressure and flow of the fluid passing through said by-pass passageway; a first control pressure passageway in the top section connecting said fluid pressure well and said jet orifice, said first valve element pressure actuator chamber above the pressure actuator therein and said by-pass passageway above the check valve therein; a control valve in said first control pressure passageway to control flow from said fluid pressure well; a second jet orifice and passageway in said middle section having an inlet for application of fluid pressure thereto, a suction passage adjacent the jet orifice discharge and a discharge passageway below the jet orifice; a check valve in the discharge passageway of said second jet orifice; a second control pressure passageway in the top section connecting said fluid pressure well and said second jet orifice, said second valve element pressure actuator chamber above the pressure actuator therein and said drain cut-off valve actuator chamber above the actuator therein; and a control valve in said second control pressure actuator passageway to control fluid pressure from said fluid pressure well.

2. A fluid distribution valve comprising a valve body having therein a fluid supply passageway with an outlet portion, a middle portion and an outlet; a supply passageway first valve seat between the inlet and middle portions of the supply passageway; a drain cavity connected to said middle portion of the supply passageway and having therebetween a second valve seat; a drain cavity in the bottom portion of said body, a drain passageway connecting said first mentioned drain cavity and said drain cavity in the bottom portion of the body; a fluid pressure actuator chamber for a drain cut-off valve pressure actuator; a drain cut-off valve in the drain passageway and provided with a fluid pressure actuator mounted in said fluid pressure actuator chamber therefor, a first valve element fluid pressure actuator chamber; a first valve element movably mounted in the body and having a pressure actuator in the fluid pressure actuator chamber therefor, a first valved means cooperating in down position to seat on said first valve seat in the supply passageway to close same off and a second valved means cooperating in up position of the first valve element to seat on said second valve seat to close off said drain cavity connected with said drain passageway; said pressure actuator for the first valve element comprising a sheet of flexible resilient material having a portion secured in said body and having a first valve element pressure transmitting portion housed in and extensible in said pressure actuator chamber and connected to said first valve element, said pressure transmitting portion for the first valve actuator having at least one annular U-shaped in cross section biasing portion surrounding and integral with a central disc pressure transmitter connected to said first valve element; a fluid pressure well connected at one end with the inlet portion of the supply passageway; a first jet orifice and passageway having a supply end and a discharge end terminating in said drain cavity in the bottom portion of said body to place a suction thereon; a service passageway in said body having an inlet portion, and an outlet portion; a service passageway first valve seat between the inlet portion and the outlet portion of the service passageway; a service drain cavity connected to said outlet portion of the service passageway in adjacent spaced relationship to said first valve seat and having a second valve seat separating the drain cavity from the service passageway outlet portion; a second valve element pressure actuator chamber; a second valve element movably mounted in the body and having a pressure actuator in the pressure actuator chamber therefor, a first valved means cooperating in down position to seat on said first valve seat in the service passageway and close same off and a second valved means cooperating in up position of the first valve element to seat on said last mentioned second valve seat to close off said service drain cavity; said pressure actuator for the second valve element comprising a further portion of said sheet of flexible resilient material having an adjacent portion secured in said body and having a second valve element pressure transmitting portion secured in said body and having a second valve element pressure transmitting portion housed in and extensible in said second valve element pressure actuator chamber and connected to said second valve element, said pressure transmitting portion last mentioned having at least one annular U-shaped in cross section biasing portion surrounding and integral with a central disc pressure transmitter connected to said second valve element; a passage connecting the service drain cavity with the bottom of said second valve element pressure actuator chamber below the pressure actuator therein; a drain passageway connecting the bottom of the second valve element pressure actuator chamber with the drain cavity in the bottom of the body, an interconnecting passageway connecting the bottom portions of said first and second valve element pressure actuator chambers whereby said lower portion of the first pressure actuator chamber drains to said lower portion of the second valve element pressure actuator chamber, a by-pass passageway discharging at one end to the outlet end of said service passageway; a check valve in said by-pass passageway preventing flow from the service passageway outlet portion to said by-pass passageway and controlling the pressure and flow of the fluid passing through said by-pass passageway; a first control pressure passageway connecting said fluid pressure well and said jet orifice, said first valve element pressure actuator chamber above the pressure actuator therein and said by-pass passageway above the check valve therein; a control valve in said first control pressure passageway to control flow from said fluid pressure well; a second jet orifice and passageway having an outlet for application of fluid pressure thereto; a suction passage adjacent the second jet orifice discharge and a discharge passageway below the second jet orifice; a check valve in the discharge passageway of said second jet orifice; a second control pressure passageway in the top portion of said body connecting said fluid pressure well and said second jet orifice, said second valve element pressure actuator chamber above the pressure actuator therein and said drain cut-off valve actuator chamber above the actuator therein; and a control valve in said second control pressure actuator passageway to control fluid pressure from said fluid pressure well.

3. A fluid distribution valve comprising a valve body having a top section, a middle section and a bottom section detachably connected, a first gasket means separating the top and middle sections, a second gasket means separating the middle and bottom sections, said gasket means being of flexible and resilient sheet material, said valve body having a fluid supply passageway with an inlet portion in the bottom section, a supply passageway first valve seat in the bottom section between the inlet portion and middle portion of the supply passageway; a drain cavity in the middle section connected to said middle portion of the supply passageway and having therebetween a second valve seat; a drain cavity in the bottom section having a discharge opening to the outside of said lower section; a drain passageway in the middle section connecting said drain cavity in the middle section with the drain cavity in the bottom section; a fluid pressure actuator chamber in the middle section for a drain cut-off valve pressure actuator; a drain cut-off valve in the drain passageway of the middle section and provided with a fluid pressure actuator mounted in said fluid pressure actuator chamber therefor; said first gasket means having a pressure transmitting portion therein lying over said pressure actuator chamber for the drain cut-off valve to apply pressure to said pressure actuator therein, said pressure transmitting portion having an annular U-shape in cross section portion surrounding a central disc pressure transmitter; a first valve element pressure actuator chamber in the middle section; a first valve element movably mounted in the middle section and having a pressure actuator in the pressure actuator chamber, a first valved means cooperating in down position to seat on said first valve seat in the supply passageway and close same off, and a second valved means cooperating in up position of the first valve element to seat on said second valve seat in the middle section to close off said drain cavity connection with said drain passageway in the middle section; said pressure actuator for the first valve element comprising a portion of said first gasket means that has a first valve element pressure transmitting portion therein housed in and extensible in said pressure actuator chamber and connected to said first valve element, said pressure transmitting portion for the first valve actuator having at least one annular U-shape in cross section portion surrounding and integral with a central disc pressure transmitter connected to said first valve element; a fluid pressure well in said middle section connected at one end with the inlet portion of the supply passageway; a control pressure passageway in the top section connecting said fluid pressure well and said first valve element pressure actuator chamber above the pressure actuator therein; a control valve in said control pressure passageway to control flow from said fluid pressure well to said first valve element pressure actuator chamber.

4. A fluid distribution valve according to claim 3 including a jet orifice and passageway in said middle section having a supply end terminating in the top of said middle section and a discharge terminating in said drain cavity in the lower section to place a suction thereon and passageway means in said top section connecting said control pressure passageway and said jet orifice downstream from said control valve in the control pressure passageway.

5. A fluid distribution valve according to claim 2 wherein the passage connecting the service drain cavity with the bottom of said second valve element pressure actuator chamber has a cross sectional area that bears a ratio to the cross sectional area of said drain passageway connecting the bottom of the second valve element pressure actuator chamber with the drain cavity in the bottom such that the fluid pressure beneath the first and second pressure actuators for the second valve elements in their pressure actuator chambers is equal to less than 60 percentum of a given amount of fluid pressure above said pressure actuators in the pressure actuator chambers and said service drain cavity connected with the bottoms of the pressure actuator chambers.

6. A fluid distribution valve according to claim 4 including a service passageway in said valve body with an inlet portion in the bottom section, a portion in the middle section and an outlet in the bottom section, a service passageway first valve seat in the bottom section between the inlet portion and the middle portion of the service passageway, a service drain cavity in the middle section connected to said middle portion of the service passageway and having therebetween a second valve seat, a second valve element pressure actuator chamber in the middle section, a second valve element movably mounted in the middle section and having a fluid pressure actuator in the pressure actuator chamber therefor, a first valved means cooperating in down position to seat on said first valve seat in the service passageway and close same off, and a second valved means cooperating in up position of the first valve element to seat on said last mentioned second valve seat in the middle section to close off said service drain cavity, a passage in the middle section connecting the service drain cavity with the bottom of said second valve element pressure actuator chamber below the pressure actuator therein, a drain passageway in the middle section connecting the bottom of the second valve element pressure actuator chamber with the drain cavity in the bottom section, an interconnecting passageway connecting the bottom portions of said first and second valve element pressure actuator chambers, a by-pass passageway in the middle section discharging at one end to the outlet of said service passageway in the bottom section, a check valve in said by-pass passageway preventing flow from the service passageway outlet portion to said by-pass passageway and controlling the pressure and flow of the fluid passing through said by-pass passageway, a passageway in the valve body connecting the control pressure passageway down stream from said control valve therein and said by-pass passageway to supply fluid to the by-pass passageway, a second jet orifice and passageway in said middle section having an inlet for application of fluid pressure thereto, a suction passage adjacent the jet orifice discharge and a discharge passageway below the jet orifice, a check valve in the discharge passageway of said second jet orifice, a second control pressure passageway in the top section connecting said fluid pressure well and said second jet orifice, said second valve element pressure actuator chamber above the pressure actuator therein and said drain cut-off valve actuator chamber above the actuator therein, and a control valve in said second control pressure actuator passageway to control fluid pressure from said fluid pressure well.

7. A fluid distribution valve according to claim 6 wherein the passage connecting the service drain cavity with the bottom of said second valve element pressure actuator chamber has a cross sectional area that bears a ratio to the cross sectional area of said drain passageway connecting the bottom of the second valve element pressure actuator chamber with the drain cavity in the bottom such that the fluid pressure beneath the first and second pressure actuators for the first and second valve elements in their pressure actuator chambers is equal to less than 60 percentum of a given amount of fluid pressure above said pressure actuators in the pressure actuator chambers and said service drain cavity connected with the bottoms of the pressure actuator chambers.

References Cited in the file of this patent

UNITED STATES PATENTS

| | | |
|---|---|---|
| 1,560,656 | Brown | Nov. 10, 1925 |
| 1,585,479 | Fisher | May 18, 1926 |
| 2,515,519 | Lawrence | July 18, 1950 |
| 2,517,056 | Trubert | Aug. 1, 1950 |
| 2,539,221 | Badeaux | Jan. 23, 1951 |
| 2,638,127 | Griswold | May 12, 1953 |
| 2,663,314 | Palmer | Dec. 22, 1953 |
| 2,734,773 | Ivins | Feb. 14, 1956 |
| 2,742,785 | St. Clair | Apr. 24, 1956 |
| 2,808,484 | Beck | Oct. 1, 1957 |
| 2,811,599 | Statham | Oct. 29, 1957 |
| 2,942,624 | Good | June 28, 1960 |

FOREIGN PATENTS

| | | |
|---|---|---|
| 506,043 | Canada | Sept. 28, 1954 |